April 27, 1926.
R. F. COWELL ET AL
1,582,637
CUSHION CONNECTION FOR VEHICLE CONSTRUCTION
Filed June 27, 1925   2 Sheets-Sheet 2
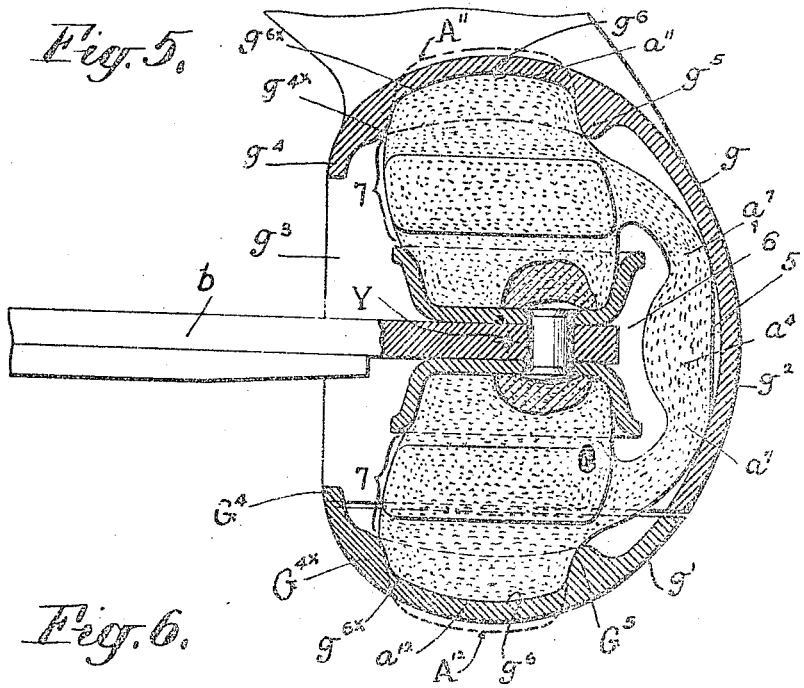
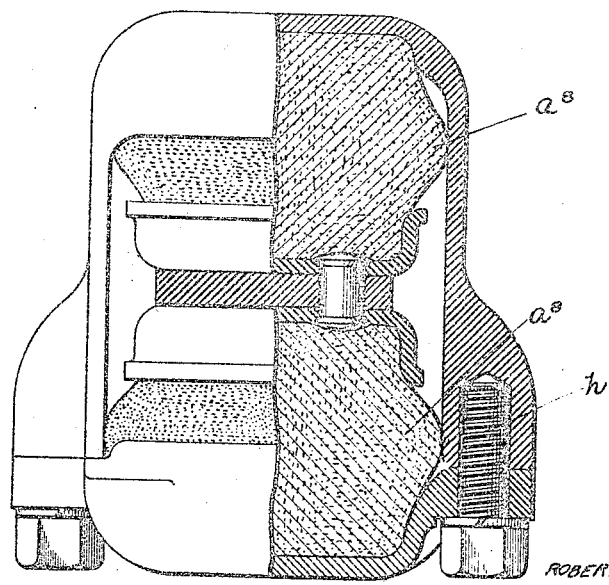
Inventor
ROBERT F. COWELL
FRED L. LIPCOT
Attorneys
Redding, Greeley, O'Shea & Campbell Patented Apr. 27, 1926.

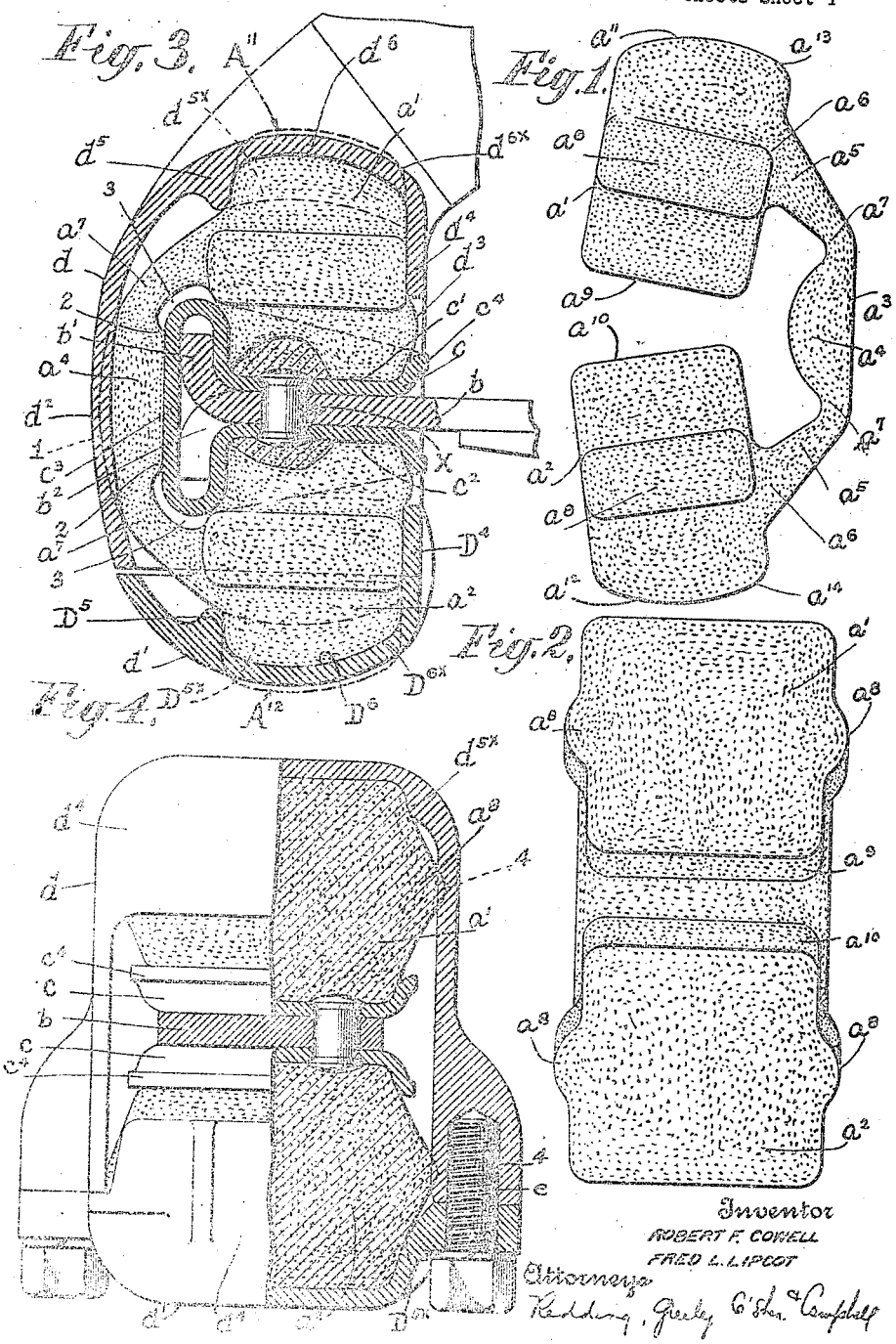

1,582,637

UNITED STATES PATENT OFFICE.

ROBERT FULTON COWELL, OF BOGOTA, NEW JERSEY, AND FRED L. LIPCOT, OF NEW YORK, N. Y., ASSIGNORS TO THE RUBBER SHOCK INSULATOR COMPANY, INC., OF NEW YORK, N. Y., A CORPORATION OF DELAWARE.

CUSHION CONNECTION FOR VEHICLE CONSTRUCTION.

Application filed June 27, 1925. Serial No. 39,932.

*To all whom it may concern:*

Be it known that we, ROBERT FULTON COWELL and FRED L. LIPCOT, citizens of the United States, residing, respectively, at Bogota, in the State of New Jersey, and in the borough of Manhattan of the city of New York, in the State of New York, have invented certain new and useful Improvements in Cushion Connections for Vehicle Construction, of which the following is a specification, reference being had to the accompanying drawings, forming a part hereof.

This invention relates to connections of the kind in which yielding non-metallic material serves as a cushioning connection and support between metallic parts of a motor vehicle one of which parts is to be connected to and supported by the other part. The invention has particular reference to a connection and support adapted to be interposed between the ends of the vehicle leaf spring and the chassis frame in a motor vehicle. Such cushion connection is illustrated broadly in the patent to Alfred F. Masury and August H. Leipert No. 1,404,876 dated January 31, 1922. Prior to the improvements of Masury and Leipert a leaf spring was connected to the chassis frame at one end by a pin passing through an eye formed on the end of the spring while the other end of the spring was connected to the chassis frame by means of a link which permitted a degree of movement of the end of the spring during flexing under load, rebound, etc. In the patent to Alfred F. Masury and August H. Leipert No. 1,463,655 dated July 31, 1923 there is disclosed yielding non-metallic connections between both ends of the spring and the chassis frame wherein the cushion connection at one end of the spring was made of either different dimensions or different form or both from the cushion connection at the other end of the spring whereby relatively free elongation of the spring at one end was permitted while the other end was relatively fixedly confined. The present invention seeks to provide a cushion connection of the general character discussed wherein the block of yielding non-metallic material shall be the same in shape and dimensions at both ends of the spring and which shall be capable, in co-operation with the housing within which it is retained of assuming the desired action with respect to the spring end. To this end the block of yielding non-metallic material embodies some of the features of both blocks disclosed in Patent No. 1,463,655 while the housings differ in shape to alter the effect of the block. The invention will now be described more fully with reference to the accompanying drawings illustrating a preferred embodiment thereof, in which:

Figure 1 is a view in side elevation showing the block according to the present invention.

Figure 2 is a view showing the block of yielding non-metallic material but looking from the left in Figure 1.

Figure 3 is a view showing the block according to the present invention disposed within a housing whereby relatively fixed spring end action is attained.

Figure 4 is a view partly in elevation and partly in section showing the construction disclosed in Figure 3 looking from the right in that Figure.

Figure 5 is a view showing the block disposed within a housing at the other end of the spring from that of Figure 3, whereby relatively free elongation of the spring is permitted.

Figure 6 is a view partly in elevation and partly in section showing the construction disclosed in Figure 5 looking from the left in that figure.

Referring first to Figures 1 and 2, the block there illustrated is generally of the form disclosed in Patent No. 1,404,876 although embodying certain of the features and in some respects a compensation between features disclosed in the respective blocks at the opposite ends of the spring disclosed in Patent No. 1,463,655. Each block of yielding non-metallic material which is preferably of moulded rubber, is formed, in general of a load section indicated at $a'$ a rebound section indicated at $a^2$ and a thrust section indicated at $a^3$. The thrust section embodies some of the features found in both of the rubber blocks illustrated in Patent No. 1,463,655. For instance, it is formed with a substantially thick drive thrust section $a^4$ adapted to take the shocks occasioned by starting, stopping and driving whereas the portions $a^5$ connecting the thrust section $a^3$ with the load and rebound sections are formed relatively thick as at $a^6$ adjacent the load and rebound sections and relatively thin and flexible as at $a^7$ adjacent the thrust section. A pad $a^8$ is also formed upon each side of the load and rebound sections as illustrated clearly in Figure 2. It will be observed that, as initially moulded, the spring engaging surfaces $a^9$, $a^{10}$, of the respective load and rebound sections lie at an angle to each other due primarily to the form taken by the yielding non-metallic material in the thrust section $a^3$ and the connecting portions $a^5$ while the vertical height of the rebound section increases toward the rear, the outer faces $a^{11}$, $a^{12}$ of the load and rebound sections being curved to form a high point $a^{13}$ at the rear side of the load section $a'$ and a high point $a^{14}$ (relatively speaking) at the rear of the rebound section $a^2$. The function of the various features just enumerated will be more apparent as the description proceeds and the application of the block at the respective ends of the spring is made more apparent.

The application of the block to that end of the spring which it is desired to retain relatively fixed will now be described with reference to Figures 3 and 4. The spring end is indicated at $b$ and portions thereof are turned upwardly and downwardly at $b'$, $b^2$, respectively, to provide a bearing for a seat member $c$ formed with a seating portion $c'$ to receive the surface $a^9$ of the load section of the blocks and seating portion $c^2$ to receive the face $a^{10}$ of the rebound section $a^2$ of the rubber block. At the end of the spring, seat member $c$ is formed with a relatively large thrust surface $c^3$ engaging the turned portions $b'$, $b^2$ to provide a large superficial thrust bearing surface for engagement with the thrust section $a^4$ of the block. It is to be noted that the front edges $c^4$ of the seat member are relatively low. The housing while taking generally the shape of the housing disclosed in Patent No. 1,463,655 in that it is formed with a housing portion proper $d$ and a cap or closure member $d'$ differs from the housing for the other end of the spring illustrated in Figures 5 and 6 in several important particulars. In the first place it is of less depth in the longitudinal direction of the spring so that the rear wall $d^2$ compresses the thrust section $a^4$ and reduces its thickness from that indicated by the dotted line 1. Also due to the capacity of the rubber to jelly the shape of the thrust section is changed so as to engage substantially all of the superficial bearing surface of the thrust bearing $c^3$ as between the points 2—2. The front wall of the housing $d$ is formed with an aperture $d^3$ practically just sufficient to permit the entrance of the end of the spring, the front wall $d^4$ extending downwardly to engage substantially all of the outer face of the load section $a'$ as illustrated clearly in Figure 3. In order to permit the wall $d^4$ to extend as far down as possible the outer edge $c^4$ of the seat $c$ is reduced in height as pointed out hereinbefore. Rearwardly of the load section $a'$ the housing is formed with an abutment $d^5$ adapted with the wall $d^4$ to define a seat $d^6$ for the load section of the block. Similarly the load portion of the block is formed with a front wall section $D^4$ and a rear abutment $D^5$ to define a seat $D^6$ therebetween. The block is, of course, retained within the housing under compression, that is, the size in all dimensions normally exceeds the dimensions of the receiving space provided therefor in the housing. As has been pointed out hereinbefore the block is retained within the housing under compression and to accomplish this the block is oversize. Thus the surfaces $a^{11}$ and $a^{12}$ of the load and rebound sections $a^{12}$, $a^{13}$ would normally occupy the positions indicated in dotted lines at $A^{11}$, $A^{12}$, but in view of the form and position of the seats $d^6$, $D^6$ the load and rebound sections are compressed to that degree. It will be observed that the altitude of the block receiving space between the seats $d^6$, $D^6$ decreases toward the front so that at the points $d^{6x}$, $D^{6x}$ the load and rebound sections, respectively, are then more compressed than adjacent the shoulders $d^5$, $D^5$. This construction results in a tendency on the part of the block to force the end of the spring inwardly against the thrust section $a^4$ so that the spring end is always rigidly retained yieldingly, of course, within the housing to provide the so called fixed end of the spring suspension. A certain degree of pivotal movement about a center $x$ is necessary, however, at this end of the spring in order to provide for spring flexing within limits. This is accomplished by the thin portions $a^7$ which are spaced from the rear wall of the housing due to the construction thereof and because of the shape of the thrust section $a^3$ providing a space 3 which facilitates slight pivotal movement about the point $x$.

The shoulders adjacent the sides of the block are also formed in the housing as at $d^{5x}$ and $D^{5x}$ corresponding in a measure to the abutments $d^5$ and $D^5$. When the block is under the desired degree of compression which, by the way, is effective by drawing the cap $d'$ upwardly against the housing $d$ by means of bolts $e$ the flow or jellying of the rubber would cause the pads $a^8$ to normally assume the position indicated in dotted lines at 4 since, however, the lateral dimension of the housing is reduced. The pads $a^8$ are compressed as indicated and thus contribute to the relatively rigid nature of the connection whereby the end of the spring is substantially fixed.

Figures 5 and 6 disclose the connection at the other end of the spring $b$ wherein the rear end of the spring is relatively free for elongation. The housing is indicated in general at $g$ and is provided with a cap $g'$ secured to the housing by the bolts $h$. The rear wall $g^2$ is so disposed that the depth of the housing in the longitudinal direction of the spring is greater so that there is normally always a space 5 between the thrust section $a^4$ and the rear wall $g^2$ while there is also a space 6 between the end of the spring and the thrust section. The upper and lower front walls of the housing $g^4$ and $G^4$ are disposed forwardly of the seat $g^6$ and $G^6$ and are of relatively little height so as to provide an opening $g^3$ of substantial height for the spring in its flexing and rebound. Small abutments $g^{4x}$, $g^5$, $g^{4x}$ and $g^5$ define the seat for the surfaces $a^{11}$ and $a^{12}$ of the block. As in the modification disclosed in Figures 3 and 4, the seats $g^6$ are inclined forwardly as at $g^{6x}$ and $G^{6x}$ to alter the normal contour of the block shown in dotted lines at $A^{11}$ and $A^{12}$ so that the load and rebound sections have a constant tendency to force the end of the spring inwardly within the housing to prevent the disengagement of the parts while at the same time the unconstrained portions of the block indicated by the brackets 7 permit great freedom of movement about the point $y$ in flexing. The spaces 5 and 6 also contribute to this result while the relatively thin portions $a^7$ of the block allow great freedom of movement between the thrust section and the load and rebound sections. The interior transverse diameter of the housing is also greater than the housing disclosed in Figures 3 and 4, in this instance, being of such diameter as to allow the pads $a^8$ to just touch the side walls and in this manner contribute to the freedom of movement of the spring end.

It will thus be seen that a cushion connection has been provided which is applicable at either end of the spring of a motor vehicle and which is capable of a difference in function dependent upon the coacting elements of the housing whereby overstresses of the spring or over compression of the blocks is avoided while at the same time free elongation of the spring at one end is permitted.

This invention is not to be deemed limited to the precise combination of the coacting elements illustrated but modifications thereof attaining the effect desired are to be deemed within the spirit and scope of the invention.

What we claim is:

1. In a motor vehicle, a connection and support interposed between the spring and the frame comprising housings carried with the frame and into which the ends of the spring extend, respectively, substantially identical blocks of yielding non-metallic material disposed within the housings and engaging the ends of the springs, means to confine one end of the spring yieldingly against relative movement, and means to afford free elongation of the spring.

2. In a motor vehicle, a connection and support interposed between the spring and the frame comprising housings carried with the frame and into which the ends of the spring extend, respectively, substantially identical blocks of yielding non-metallic material disposed within the housings under compression and engaging the ends of the springs, means to confine one end of the spring yieldingly against relative movement, and means to afford free elongation of the spring.

3. In a motor vehicle, a connection and support interposed between the spring and the frame comprising housings carried with the frame and into which the ends of the spring extend, respectively, substantially identical blocks of yielding non-metallic material disposed within the housings, one of said housings confining a block whereby one end of the spring is retained relatively fixed and the other housing retaining a block with provision for free elongation of the spring.

4. As an article of manufacture, a block of yielding non-metallic material comprising similar load or rebound sections having seat engaging portions, a thrust section and connecting portions between the thrust section and the respective load or rebound sections varying in thickness from the load or rebound sections to the thrust section.

5. As an article of manufacture, a block of yielding non-metallic material of the character described comprising identical load or rebound sections, a thrust section and connections between the thrust section and the first named sections which vary in thickness from the first named sections to the thrust section.

6. As an article of manufacture, a block of yielding non-metallic material of the character described comprising identical load or rebound sections, a thrust section and connections between the thrust section and the first named sections which are of reduced diameter adjacent the thrust section.

7. As an article of manufacture, a block of yielding non-metallic material of the character described comprising identical load or rebound sections, a thrust section and connections between the thrust section and the first named sections which vary in thickness from the first named sections to the thrust section, said load or rebound sections being formed with curvilinear superficial surfaces to engage seats in a restraining element, the radius of curvature of the surfaces being less proximate the thrust section.

8. As an article of manufacture, a block of yielding non-metallic material of the character described comprising identical load or rebound sections, a thrust section and connections between the thrust section and the first named sections which are of reduced diameter adjacent the thrust section, said load or rebound sections being formed with curvilinear superficial surfaces to engage seats in a restraining element, the radius of curvature of the surfaces being less proximate the thrust section.

9. As an article of manufacture, a block of yielding non-metallic material of the character described comprising identical load or rebound sections, a thrust section and connections between the thrust section and the first named sections which are of reduced diameter adjacent the thrust section, said load or rebound sections being formed with curvilinear superficial surfaces to engage seats in a restraining element, the radius of curvature of the surfaces being less proximate the thrust section, and said thrust and rebound sections being formed with pads along opposite sides thereof.

This specification signed this 24th day of June A. D. 1925.

ROBERT F. COWELL
FRED L. LIPCOT.